Oct. 17, 1950 G. A. LYON 2,526,033
ENDLESS BELT ALIGNING MEANS
Filed Feb. 26, 1947 2 Sheets-Sheet 1

Inventor
GEORGE ALBERT LYON

Oct. 17, 1950          G. A. LYON          2,526,033
ENDLESS BELT ALIGNING MEANS
Filed Feb. 26, 1947          2 Sheets-Sheet 2
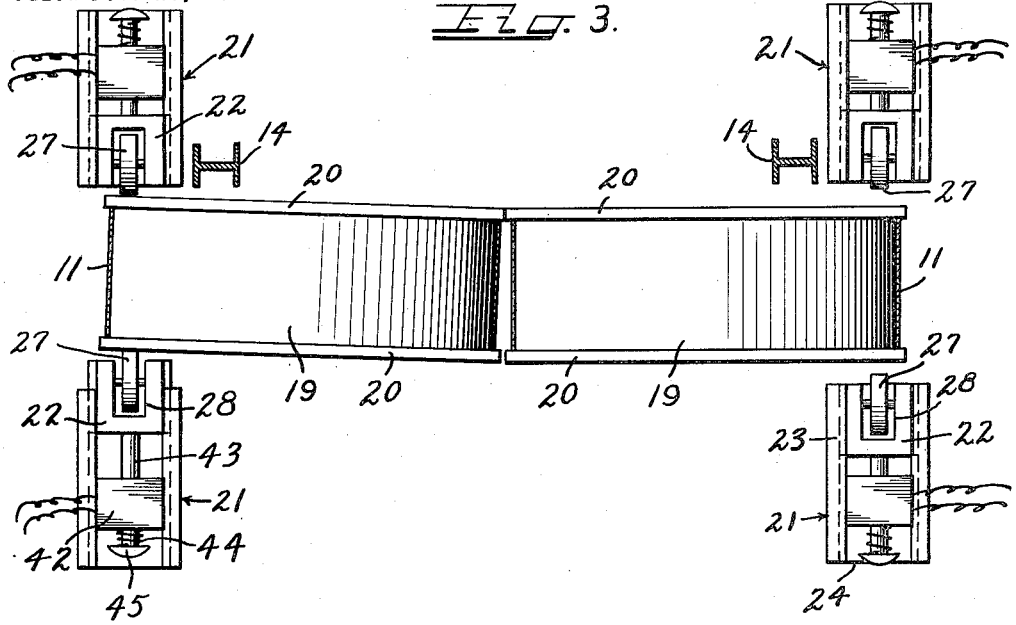
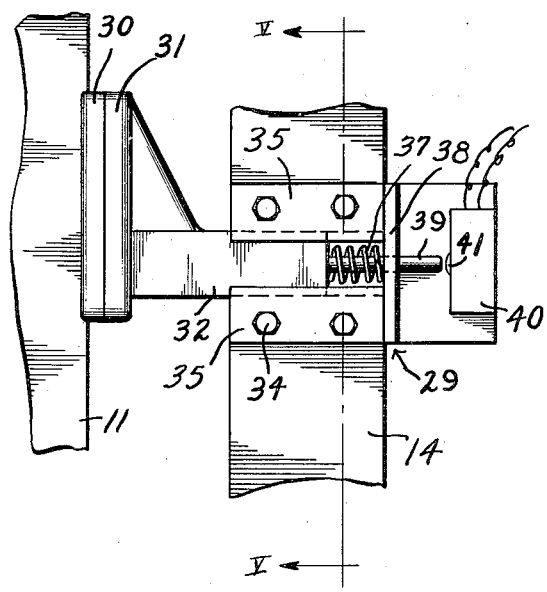
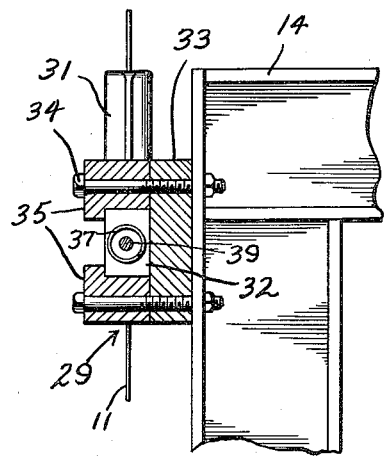
Inventor
GEORGE ALBERT LYON Patented Oct. 17, 1950

2,526,033

UNITED STATES PATENT OFFICE 2,526,033

ENDLESS BELT ALIGNING MEANS

George Albert Lyon, Detroit, Mich.

Application February 26, 1947, Serial No. 731,028

15 Claims. (Cl. 74—241)

This invention relates to improvements in the control of endless belts running over unflanged rollers from which the belts may tend to creep edgewise but with which the belts must be maintained in alignment for proper results in operation.

An important object of the present invention is to provide improved means which will respond to shifting from alignment of a running endless belt to return the belt to proper alignment.

Another object of the invention is to provide novel electrical control means for operating a belt aligning device.

A further object of the invention is to provide novel electrically actuated belt aligning means automatically operative in response to misalignment of the belt with which associated.

Still another object of the invention is to provide means for automatically maintaining cooperative endless belts in proper running alignment.

According to the general features of the invention, there is provided in association with an endless belt to be maintained in a particular alignment a follower which is located to be actuated by the edge of the belt adjacent to the point where the belt is liable to shift out of alignment, and a belt aligner located at a point remote from the follower and responsive to actuation of the follower to engage and effect realignment movement of the belt.

According to other general features of the invention the follower and the belt aligner are connected in an electrical circuit under the control of the follower.

According to further general features of the invention, there is provided in a belt aligning device a follower movable by the edge of the belt and a switch located to be actuated by movement of the follower responsive to actuation by the edge of the belt for closing an electrical belt aligner circuit.

According to still other general features of the invention, a belt aligner is provided which normally remains free from the belt with which it is associated but is adapted to effect realignment movement of the belt upon shifting of the belt out of predetermined alignment.

According to yet other features of the invention, there is provided an assembly of belt aligning members disposed on opposite sides of a belt to be maintained in alignment and selectively operable for returning the belt to proper alignment when the belt moves out of alignment toward either side, the alignment members cooperating to restrain the belt against over-shifting during realignment operations.

Other objects, features and advantages of the present invention will be readily apparent from the following detailed description of a preferred embodiment thereof taken in conjunction with the accompanying drawings in which:

Figure 3 is an enlarged horizontal sectional view taken substantially along the line III—III of Figure 1;

Figure 4 is a fragmentary enlarged side elevational view of one of the belt-edge follower controls of the belt aligning means, and Figure 5 is a horizontal sectional view taken substantially on the line V—V of Figure 4.

As shown on the drawings:

Figures 1, 2:
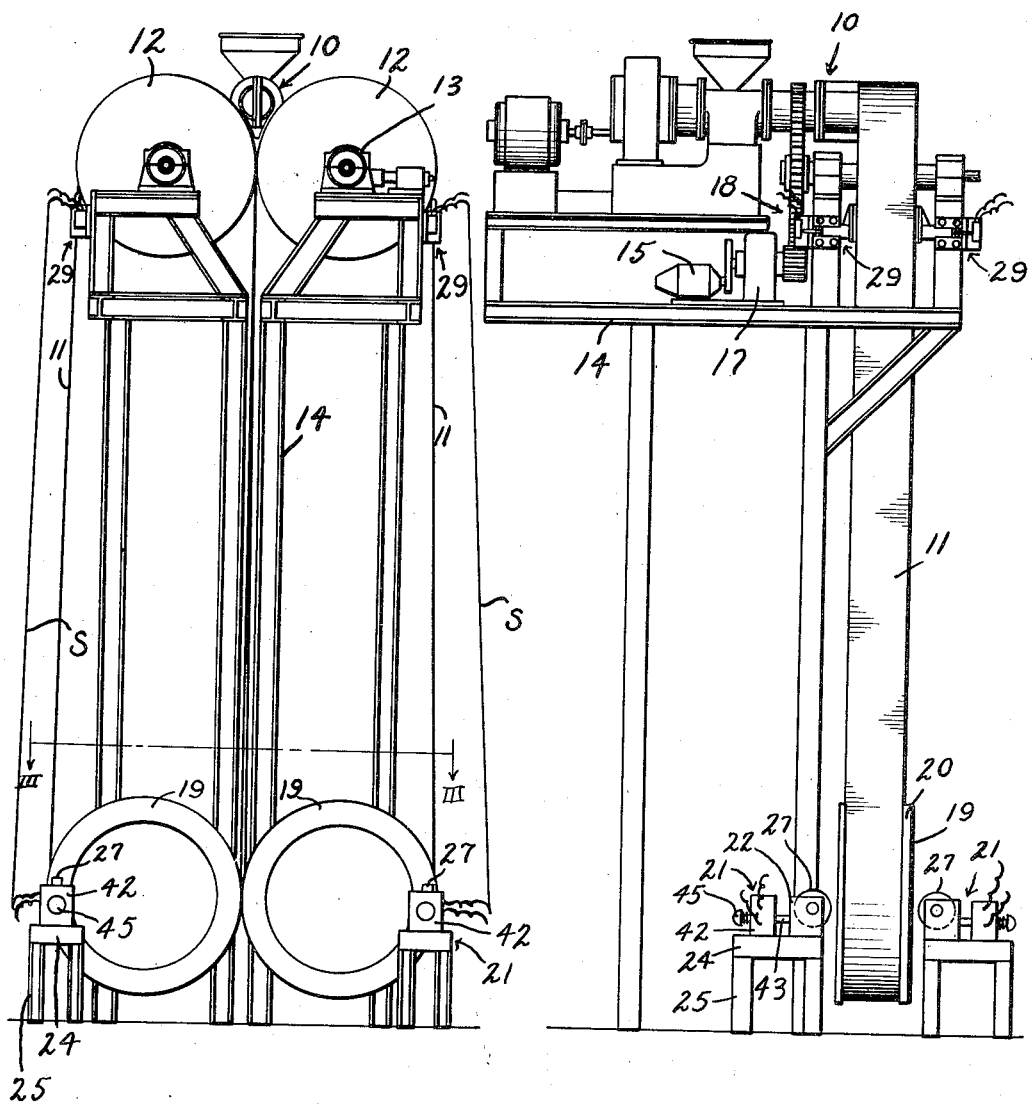
Figure 1 is a more or less schematic front elevational view of a machine utilizing endless belts and having belt aligning means according to the present invention.
Figure 2 is a side elevational view of the machine shown in Figure 1.

An apparatus with which the belt aligning system or means of the present invention is particularly useful comprises a plastic sheet forming machine as shown more or less schematically in Figs. 1 and 2. In such a machine plastic material in a fluid state is supplied from an extruder 10 between a pair of endless forming belts 11 which may be made from stainless steel. The forming belts 11 are supported to run vertically by respective combined driving, heating and pressure rolls 12 which are supported rotatably in journals 13 carried by the top of a supporting framework 14. Power for driving the rolls 12 towards one another in unison is derived from a motor 15 operating through a gear reduction device 17 and a train of gears 18 connected with the roll shafts.

The belts 11 are held stretched, and are separated from one another at the lower ends of their reaches to release the formed plastic sheet, through the action of free weighting and separating rolls 19 which may be of ring form. Each of the rolls 19 is formed with a pair of radially outwardly extending annular flanges 20 at the respective edges of its periphery. These flanges are adapted to ride against the similar flanges of the companion weighting and separating roll and maintain the belt-engaging peripheries of the rolls in spaced relation at their points of closest approach, thereby separating the forming reaches of the belts for releasing the formed plastic preparatory to return of the belts to the heating and pressure rolls 12.

In view of the close spacing which must prevail between the forming belts 11 at the point of entry of the plastic material therebetween, that is at the point of nearest approach of the pressure and heating rolls 12, it is impractical to have the rolls 12 equipped with guide flanges which would keep the respective belts 11 centered or aligned with the rolls and with respect to each other. The peripheries are therefore cylindrical. Hence, any inaccuracies in belt tension or expansion or contraction, deviation from absolutely horizontal parallelism of the axes of the rolls 12, slight inaccuracies in the concentricities of the cylindrical peripheries of the rolls, and the like, tends to cause the belts 11 to creep out of alignment in the course of operation. That is, one or the other, or both of the belts 11 may work over toward and project edgewise beyond the side of the roll 12 over which it is trained. This is highly objectionable, of course, because for proper forming of the plastic between the belts and uniformity of surface plane, uniform pressure must be applied thereto throughout the width of the belts and the belts must make full contact over the whole width of the formed plastic sheet. Since the reaches of the forming belts may be many feet in length, in a typical installation attaining to over 30 feet, it will be appreciated that this matter of maintaining the belts in alignment presents a considerable problem.

According to the present invention, the forming belts 11 are effectively maintained in operative alignment by utilizing the tendency of a belt to creep edgewise in the direction of biasing twist thereon, and more especially a twist imparted to the return run or reach thereof, that is the reach which is traveling toward the roller over which the belt is trained. For this purpose, a selectively operable biasing device 21 (Fig. 3) is cooperatively disposed at each side of the lower end portion of the return reach of each of the forming belts 11. The biasing devices 21 are so constructed and arranged that when it becomes desirable to realign the belt 11 with which it is associated, the return reach of the belt will be appropriately twistingly deflected from its normal path to bias the same toward the side toward which the belt must be shifted for realignment.

Each of the biasing devices 21 is a unit including a movable biasing block 22 mounted in a track 23 upon a carriage 24 including a framework 25 (Figs. 1 and 2). The carriage 24 is disposed at a height and in such location that the end of the track 23 is in spaced adjacent relation to the rim of the associated weighting roll 19 near the point where the return stretch of the belt 11 leaves the roll.

When the biasing block 22 is actuated to move it outwardly in its track 23 to project beyond the track, an anti-friction roller 27 carried by the block engages the side of the weighting roll rim and pushes the latter laterally. This causes the roll to swing about a vertical axis and twists the return stretch of the belt 11 to impart a bias thereto in the direction of the corrective shifting of the belt desired.

As seen in Figure 3, the biasing devices 21 are disposed in directly opposed relation at opposite sides of the rims of the respective weighting rolls 19, and in the inactive or retracted positions of the biasing blocks 22 they leave the weighting roll entirely free therebetween. The anti-friction rollers 27, which are disposed in respective slots 28 in the biasing blocks 22 and have the peripheries thereof projecting beyond the forward ends of the blocks, adequately clear the outer sides of the blocks for operative engagement with the rims of the weighting rolls 19. In the fully retracted positions of the biasing blocks 22, the anti-friction rollers 27 are adapted to project beyond the ends of the respective tracks 23 and serve as anti-friction buffers or stops to limit swinging or deflection of the weighting rolls 19 either due to the biasing action of the opposing biasing block 22 or due to any other cause. This relationship is best exemplified at the left side of Figure 3.

Means are provided for rendering the biasing blocks 22 selectively active for belt deflection automatically when the belt 11 controlled thereby shifts beyond a predetermined limit from its operative path. Since the deflection tolerances for the belts 11 must necessarily be fairly close, the alignment control system must be reasonably sensitive. Herein the control means include a detector unit 29 disposed at each edge of the return stretch of each of the belts 11 as close as practicable to the point where the respective belts engage the pressure rolls 12, that is, adjacent to the extreme upper ends of the return stretches of the belts.

As best seen in Figures 4 and 5, each of the detector units 29 includes a shoe 30 in engagement with the edge of the belt and replaceably carried by a bracket 31. The latter has a cantilever support arm 32 reciprocably slidable in a carriage 33 attached by means of bolts 34 to the frame 10 and including a pair of parallel bars 35 forming a track or slideway for the arms 32.

The shoe 30 is normally urged into engagement with the edge of the belt 11 by means such as a coiled tension spring 37 which acts against the inner end of the arm 32 and bears against a stationary angle plate 38.

Extending beyond the inner end of the arm 32 is a switch-operating pin 39 which projects freely through the angle plate 38 and is adapted to close a normally open limit or micro-switch housed in a casing 40 supported by the angle plate. As shown in Figure 4, the switch may have an operating button 41 adapted to be actuated by the adjacent end of the pin 39 upon relatively small inward movement of the detector shoe unit resulting from shifting of the belt 11 from its operative path.

Upon closing of the normally open switch in the housing 40, an electrical circuit S is closed to energize a fixedly mounted solenoid 42 of the companion biasing device 21. This causes an armature secured to the biasing block 22 to drive the block outwardly on its track to project therebeyond and deflect the associated weighting roll 19 and thus the belt 11. As soon as the belt 11 has shifted back to its proper path, the shoe 30, of course, follows the edge of the belt under the influence of the spring 37 and the switch operating pin 39 is released from the switch operator which promptly opens and breaks the electrical circuit S and deenergizes the solenoid 42. Immediately upon such deenergization of the solenoid 42, a return spring 44 acting upon a head 45 at the outer free end of the armature 43 draws the armature through the solenoid and returns the biasing block 22 to its inactive position.

It will thus be apparent that both of the forming belts 11, will as a result of the sensitive, automatic detector and biasing devices 29 in the belt aligning system be maintained at all times in proper alignment within very close limits.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination with a machine including an endless belt traveling through a relatively long return reach in a vertical plane and freely supporting a tensioning roll in the lower turn of the belt, means for maintaining the belt in a predetermined path including a reciprocable member selectively engageable with the side of said tensioning roll to deflect the same for biasing the belt to return the belt to said predetermined path when the belt shifts from said path during running thereof and means for actuating said member.

2. In combination with a machine including an endless belt traveling through a relatively long return reach in a vertical plane and supporting a tensioning roll in the lower turn of the belt, means for maintaining the belt in a predetermined path including a member engageable with the side of said tensioning roll to deflect the same for biasing the belt to return the belt to said predetermined path when the belt shifts from said path during running thereof, and means for actuating said member, said member being in the form of a reciprocably guided block having anti-friction means thereon for contacting the tensioning roll.

3. In combination with a machine including an endless belt traveling through a relatively long return reach in a vertical plane and supporting a tensioning roll in the lower turn of the belt, means for maintaining the belt in a predetermined path including a member engageable with the side of said tensioning roll to deflect the same for biasing the belt to return the belt to said predetermined path when the belt shifts from said path during running thereof, means for actuating said member, and a detector unit associated with the upper end of the return reach of the belt for detecting deviation from the predetermined path and operably connected with the actuating means for said biasing member to control the operation of the same.

4. In combination with an endless metal belt running over a driven roll and depending therefrom, the belt being maintained under tension by a tensioning roll suspended in the lower loop of the belt, and means for maintaining the belt aligned on said driven roll including a selectively operable member engageable with said tensioning roll to deflect the same and impart a shifting bias to the belt.

5. In combination with a traveling belt trained over an unflanged roll and having a return stretch of substantial length, the belt being subject to shifting from a predetermined operative path due to inaccuracies in the roll or in the belt and lack of holding flanges on the roll, a pair of belt biasing units respectively disposed adjacent to the opposite sides of the trailing end portion of the return stretch of the belt and each including a member carrying an anti-friction roller, each of said roller carrying members being mounted for movement toward the belt for deflecting the belt toward the other of said biasing units, and means for actuating said roller carrying members selectively, the respective rollers being disposed in the inactive condition of the respective biasing units to limit the deflection movement of the belt under the influence of the opposite biasing unit when the roller carrying member thereof is actuated by said actuating means to deflect the belt.

6. In an endless belt installation including an unflanged driving roll having an endless belt trained thereover and depending therefrom with the lower loop of the belt supporting a flanged tensioning roll freely therein, the belt being subject to shifting axially of the supporting and driving roll in running thereover, a belt aligning member movable in an axial direction relative to said tensioning roll and arranged to ride against the side of the tensioning roll for pushing the tensioning roll to twist it from its normally suspended position as carried by the belt so as to deflect and bias the belt for realigning it on said supporting and driving roll, and means located at the side of the belt adjacent to where the belt runs over the supporting and driving roll for detecting misalignment of the belt and connected with said aligning member for controlling the latter.

7. In an endless belt assembly including an endless belt depending from an unflanged driving roll and having a freely supported flanged tensioning roll in the lower loop of the belt substantially below the unflanged supporting and driving roll, a detector member at each edge of the return run of the belt closely adjacent to the supporting and driving roll for detecting shifting out of alignment of the belt in its plane in either axial direction relative to said roll, and corresponding belt aligners located at opposite sides of the tensioning roll adjacent the trailing end of the return run of the belt and operably connected with the respective corresponding detectors to be actuated in response to misalignment movement toward either of the detectors to push against the respective side of the tensioning roll for biasing the belt and returning the same to proper alignment with the supporting and driving roll.

8. In a plastic sheet forming machine including a pair of cooperating opposed forming rolls, an endless forming belt suspended from and running over each of the rolls with the adjacent runs of the belts running downwardly over the rolls so as to carry a formed plastic sheet downwardly therebetween, each of the belts having a freely supported flanged tensioning roll in the lower loop of the belt, said forming rolls having cylindrical peripheries throughout and thus lacking means for preventing the respective belts from running out of alignment due to various manufacturing inaccuracies, and means for returning each respective belt to proper alignment when it runs out of alignment toward either end of its forming and carrying roll including a detector at each edge of the return run of each belt adjacent to the supporting and forming roll by which the belt is carried and corresponding belt aligners engageable selectively with the respective opposite sides of the tensioning roll of each belt adjacent to the trailing end of the return run of such belt and under the control of the respective detectors, said aligners being operable to push against the respective tensioning rolls to tilt the same on their respective axes and thus bias the respective belts while running for returning the belts to alignment in the event of deviation from proper alignment.

9. In a plastic forming machine including a pair of unflanged forming rolls in closely adjacent relation and having a pair of endless belts supported thereby and depending therefrom with flanged tensioning rolls carried by the lower loops of the belts and having the flanges thereof riding against each other and defining a spaced relation between the lower portions of the downward runs of the belts, means for maintaining the belts in proper alignment on said forming rolls comprising a reciprocable member adjacent to each side of each of the tensioning rolls adjacent to the trailing end of the return run of the respective belt supporting the tensioning rolls, and means for actuating said aligning members selectively to push against the respective adjacent sides of the tensioning roll to swing the roll from its normal axis and thereby bias the return run of the belt to return to proper alignment.

10. In combination in a belt aligning device of the type adapted to engage the freely supported tensioning roll of a suspended endless belt to twist the tensioning roll from its normal axis for realignment biasing of the belt, a supporting structure, a horizontal guideway on said supporting structure, a block slidably guided by said guideway, an anti-friction roller having the periphery thereof projecting beyond an end of the block, and means at the opposite end of the block for selectively moving said block reciprocably in said guideway for engagement of or retraction from the side of the tensioning roll.

11. In a belt aligning system, a detector construction comprising a support providing a longitudinal guideway, a belt edge engaging shoe having a cantilever support arm reciprocably mounted in said guideway, means normally biasing the support arm in one direction in said guideway to carry the shoe into engagement with the edge of the belt, a switch operating pin extending from said opposite end of said arm, and an electrical switch adapted to be operated by said pin upon movement of said shoe and arm by the belt in opposition to the biasing means for closing an electrical actuating circuit for means such as a belt aligner.

12. In combination in a belt aligning construction, a reciprocable belt edge follower serving as a detector, an electric switch normally open and arranged to be closed by said follower upon movement of an engaged belt out of alignment, and a belt aligner member including a solenoid in circuit with said switch and a connection between the aligner member and the solenoid for effecting projection of said aligner member toward the belt to be aligned upon closing of said switch and energizing of the solenoid.

13. In an endless belt installation wherein an endless belt running over an unflanged roll depends freely from said roll and has in the lower loop thereof a flanged tensioning roll freely supported by the belt, a pair of belt aligning members, means supporting said members in spaced opposition at respective opposite sides of the tensioning roll and in spaced relation thereto adjacent to the return run of the belt which supports the tensioning roll and with the roll and belt suspended freely between said members, means carried by said respective supports for selectively actuating said members into engagement with the opposing sides of the tensioning roll for pushing the tensioning roll therefrom to bias the belt for realignment, and detector means associated with the upper portion of the return run of the belt for detecting any misalignment of the belt and selectively actuating said aligners.

14. In apparatus for effecting realignment of an endless belt which is suspended from a driving roll and has a freely supported tensioning roll carried thereby in the lower loop of the belt, means for pushing against the side of the tensioning roll adjacent to the trailing end of the return run of the belt to twist the tensioning roll from its normal operating axis and thereby biasing the return run of the belt in the direction of desired realignment movement of the belt on said supporting and driving roll, and means for actuating said pushing means when the belt requires realignment.

15. In apparatus for maintaining a pair of endless forming belts in proper alignment with respect to each other and to a pair of belt supporting and forming rolls over which the belts are trained and from which they are suspended, the forming rolls lacking belt retaining flanges, the belts having freely supported tensioning rolls carried by the lower loops of the belts and with retaining flanges riding together for separating the downward runs of the belts, means for tilting either of the tensioning rolls relative to the other tensioning roll to bias the return run of the belt supporting the tilted roll for returning the biased belt into proper alignment whenever it runs out of alignment, and means for actuating said tilting means when the respective belts require realignment.

GEORGE ALBERT LYON.

REFERENCES CITED

The following references are of record in the file of this patent:

UNITED STATES PATENTS

| Number | Name | Date |
|---|---|---|
| 1,178,602 | Smith | Apr. 11, 1916 |
| 2,075,111 | Gulliksen et al. | Mar. 30, 1937 |
| 2,210,925 | Hill | Aug. 13, 1940 |